(12) United States Patent
Wainwright et al.

(10) Patent No.: US 7,553,508 B1
(45) Date of Patent: Jun. 30, 2009

(54) AMYLOPECTIN POTATO FLAKES OR GRANULES AND THEIR USE IN SNACK FOODS

(75) Inventors: Andrew Richard Wainwright, Reading (GB); Alexander Thomas Paul, Middlesborough (GB); Fiona Jane Scriven, Aylesbury (GB); Lisa Bates, Reading (GB)

(73) Assignee: Cooperative Verkoop-en Productievereniging van Aardappelmeel en Derivaten AVEBE B.A., JA Veendam (NL)

( * ) Notice: Subject to any disclaimer, the term of this patent is extended or adjusted under 35 U.S.C. 154(b) by 0 days.

(21) Appl. No.: 09/936,242

(22) PCT Filed: Mar. 10, 2000

(86) PCT No.: PCT/NL00/00167

§ 371 (c)(1),
(2), (4) Date: Feb. 1, 2002

(87) PCT Pub. No.: WO00/54609

PCT Pub. Date: Sep. 21, 2000

(30) Foreign Application Priority Data

Mar. 15, 1999 (GB) .................................. 9905903.2

(51) Int. Cl.
*A23L 1/217* (2006.01)
(52) U.S. Cl. .................... 426/550; 426/560; 426/637; 426/640
(58) Field of Classification Search ......... 426/549–550, 426/560, 637, 640
See application file for complete search history.

(56) References Cited

U.S. PATENT DOCUMENTS

| | | | | |
|---|---|---|---|---|
| 4,806,377 A * | 2/1989 | Ellis et al. | .................... | 426/549 |
| 4,834,996 A | 5/1989 | Fazzolare et al. | | |
| 5,429,834 A * | 7/1995 | Addesso et al. | ............. | 426/549 |
| 5,759,597 A * | 6/1998 | Stahl | ........................... | 426/48 |
| 5,824,798 A * | 10/1998 | Tallberg et al. | ............. | 536/128 |
| 6,022,574 A | 2/2000 | Lanner et al. | | |
| 6,541,060 B2 * | 4/2003 | Jeffcoat et al. | ............. | 426/578 |
| 6,544,580 B1 * | 4/2003 | Martines-Serna Villagran et al. | ............. | 426/637 |
| 6,699,519 B2 * | 3/2004 | Mikla et al. | ................ | 426/438 |
| 6,703,065 B2 * | 3/2004 | Villagran et al. | ............. | 426/637 |
| 6,720,019 B2 * | 4/2004 | Mikla et al. | ................ | 426/589 |

FOREIGN PATENT DOCUMENTS

| | | |
|---|---|---|
| EP | 0 703 314 | 3/1996 |
| EP | 000703314 A1 * | 3/1996 |
| EP | 000799837 A2 * | 10/1997 |
| GB | 1 232 497 A | 5/1971 |
| JP | 62100248 | 5/1987 |
| JP | 63226248 | 9/1988 |
| JP | 63313544 | 12/1988 |
| JP | 1047347 | 2/1989 |
| JP | 3201948 | 9/1991 |
| JP | 11502726 T | 3/1999 |

OTHER PUBLICATIONS

Translation of the de Vries refrence (IDS of Jan. 14, 2002).*
European Commission for Consumer Plicy and Consumer Health Protection opinion, Jul. 18, 2002, Application for consent to place on the market genetically modified high amylopectin potatoes.*
de Vries, J A: "Nieuwe Mogelijkheden Met Amylopectine-Aardappelzetmeel" Voedingsmiddelen, Technologie, NL, Noordervliet B.V. Zeist, 28 (23):26-27 (Nov. 1995).
Dr. Pieter Buwalda, "Sheer versatility," *Potato Business World*, May/Jun. 1998.
Visser, et al. "Some Physicochemical Properties of Amylose-free Potato Starch" *Starch* (1997)11:443-448.

* cited by examiner

*Primary Examiner*—Drew E Becker
(74) *Attorney, Agent, or Firm*—Hoffmann & Baron, LLP

(57) ABSTRACT

Snack foods are prepared, at least in part, from potato flakes and/or potato granules which are derivable from potatoes in which the starch has a higher than normal amylopectin content, for example, waxy potatoes. The snack foods have improved texture and appearance.

17 Claims, No Drawings

AMYLOPECTIN POTATO FLAKES OR GRANULES AND THEIR USE IN SNACK FOODS

This application is the U.S. National Phase of International Application Number PCT/NL00/00167 filed on Mar. 10, 2000.

BACKGROUND OF THE INVENTION

The present invention relates to snack foods. More particularly, it relates to snack foods comprising dehydrated potato and to their manufacture.

Snack foods made from potato are well known, and are available in a wide range of shapes and flavours. One form of snack food derived from potatoes is the potato crisp, known in the USA as the potato chip, which is commonly prepared by slicing potatoes and frying the slices. It is also known to manufacture snack foods by preparing a dough from dehydrated potato material, forming that dough into pieces of desired shape, for example by sheeting and subsequently cutting the dough sheet, or by extrusion, and then frying or baking the shaped dough pieces. The manufacture of snack foods from dehydrated potato material has the advantages that it is easier to maintain consistency of the product throughout the year in spite of seasonal variations of potatoes and that a wider variety of shapes can be made relatively easily. Potato flakes and potato granules are forms of dehydrated potato which are particularly well suited for use in the manufacture of snack foods.

U.S. Pat. No. 5,429,834 describes preparation of snack products from a dough based on ingredients such as potatoes which are high in starch but lack gluten. It is suggested that the elasticity of such doughs may be increased by adding a pregelatinised waxy starch such as pregelatinised waxy maize starch.

Despite the great variety of potato snack foods now available there remains a demand for improved snack foods, for example, potato snack foods having an improved texture.

The present invention provides a snack food comprising high amylopectin potato flakes and/or high amylopectin potato granules.

The starch of plants commonly consists of two types of glucose polymer, amylopectin and amylose. Amylopectin is highly branched and has a very high degree of polymerisation, for example, about 2,000,000. Amylose is, in contrast, linear or lightly branched and has a lower degree of polymerisation of about 1000 to 5000. Those differences in structure lead to significant differences in properties between amylopectin and amylose. For example, amylopectin is highly soluble in water and forms clear gels of reasonably stable viscosity. It is believed that that is because its high degree of branching prevents ordering of the molecules in solution. In contrast, amylose quickly crystallises out of aqueous solution. It follows that the properties of a starch from a given source will be dependent on the ratio of amylopectin to amylose.

There exist natural varieties of some cereals such as maize and rice in which the starch is substantially all amylopectin with less than 5%, and usually less than 2%, amylose. Maize of which the starch consists of 100% amylopectin is known as waxy maize and the starch from waxy maize has since the 1940s found a number of applications, principally in paper manufacture but also as a thickener in foods. EP 0,314,320 A1 discloses snack foods which comprise waxy maize masa and which are stated to have a different texture from equivalent foods made with dent corn. Nevertheless, waxy maize material other than isolated starch has not found wide application in snack foods.

The starch of potatoes typically consists of approximately 20% amylose and 80% amylopectin, although that ratio varies slightly according to the variety of potato and growing conditions. References herein to a normal amylopectin content in potato starch are intended to imply an amylopectin content of about 80%±3%, dry weight basis. At present, there are no known natural varieties of potato in which the starch consists substantially entirely of amylopectin. For a number of years, however, there have been available genetically modified potato plants which produce potatoes in which substantially all of the starch consists of amylopectin.

EP 0,703,314 A and the references therein describe genetically modified amylopectin potatoes (known as "waxy potatoes") and the use of the separated amylopectin potato starch from those potatoes as a wet-end additive in paper making. EP 0,799,837 A discloses the preparation of an aqueous composition comprising amylopectin potato starch in combination with an emulsifier and suggests that such compositions may find application in products having a gel structure, for example, food products such as puddings, jellies and custard or in foods having the form of viscous liquids such as sauces, creams and soups.

EP 0,703,314A and EP 0,799,837A describe applications of the starch isolated from the waxy potatoes. In contrast, the present invention is concerned, not with the separated starch, but instead with the use of whole potato (less the skin) in the form of potato flakes and/or granules.

SUMMARY OF THE INVENTION

The present invention provides a snack food comprising high amylopectin potato flakes and/or high amylopectin potato granules.

DETAILED DESCRIPTION OF THE INVENTION

The expressions "high amylopectin potato flakes" and "high amylopectin potato granules" as used herein are to be understood as meaning potato flakes or granules, respectively, prepared from potatoes of which the starch has an amylopectin content of 85% or more, advantageously 90% or more, preferably 95% or more, and more preferably 98% or more, dry weight basis. The flakes and granules are thus richer in amylopectin than flakes and granules made from the currently known natural potato varieties.

Although waxy starch in the form of isolated starch, for example, pregelatinised waxy maize starch, is known as an additive to potato doughs, the use of such starch as the sole solid component in a dough has been found to be unsatisfactory leading to a highly uniform continuous starch matrix with a relatively hard structure. Moisture is released only slowly during cooking leading to a very even, but poorly expanded structure, with a harder texture compared to a dough made with high amylopectin potato flake.

The use of high amylopectin potato flakes and/or granules in accordance with the present invention has been found to give a more expanded product with an improved texture when compared to snacks prepared using potato flakes and/or granules having a normal level of amylopectin. The increased expansion and improved texture are unexpected, as snack foods prepared from pieces of high amylopectin potatoes, (that is from high amylopectin potato material that has not been dehydrated) have been found not to have the improved qualities of the snack foods according to the invention. It is believed that those improved qualities result from use of the potato flakes and/or granules in which there is combination of pregelatinised high amylopectin starch within a potato cell structure that remains partially intact. It is further believed that this is in part because the onset of the glass transition during cooking may be delayed in the snack food of the invention because the glass transition occurs in amylopectin at a given temperature at lower water contents than for amylose. During cooking of a snack food the starch is initially in a rubbery state but, as water is boiled away, the moisture content drops and the starch eventually passes into the glassy state, after which expansion of the snack food is thought substantially to cease. This transition will occur later in high amylopectin potato starches than in normal potato starch, thus giving an increased time for expansion to occur.

The use of high amylopectin potato flakes and/or granules in accordance with the present invention has furthermore been found to improve the appearance of the snack food. In particular, surface characteristics of the snack food are such that the surfaces are more reflective and can be described as more "shiny" than comparable products made from conventional potato flake.

Methods of making potato flakes and granules are well-known in the art and are discussed in "Potato Processing", $4^{th}$ Edition, Eds. W. S. Talburt and O. Smith, AVI, USA, 1987.

Preferably the high amylopectin potato content of the snack food is substantially all in the form of potato flakes. Methods of making potato flakes typically fall into two categories of process, which are known respectively as the low leach (or single stage) process and the standard (or three stage) process. In both processes the potatoes are peeled and sliced prior to heat treatment.

In the low leach process the sliced potato is cooked in hot water or steam (for example at 95° C. to 100° C. for 15 to 30 minutes) and is then mashed. In the standard process the sliced potatoes are heated in hot water or steam (for example at 70° C. for 20 minutes), then cooled (for example to 20° C. for 20 minutes), cooked (for example at 95° C. to 100° C. for 15 to 30 minutes) and mashed. In both processes, the mashed potato is drum-dried into a thin sheet which is then ground to produce the potato flakes. Optionally, emulsifier may be added to the mashed potato before it is drum-dried.

The main difference between the flakes made by the low leach and standard processes is the level of free soluble starch, which can be measured spectrophotometrically after complexing with iodine (blue value). The low leach flakes have a higher level of free soluble starch (that is, more starch that is outside residual intact potato cells). In snack manufacture, that can lead to stickier doughs and more expanded products.

Methods of making potato granules typically include the steps of cooking potato slices until the starch is fully gelatinised, mixing the cooked potato with previously dried granules and then drying the mixture. The potato cells remain predominantly intact through the manufacturing process and the level of free soluble starch is generally relatively low in comparison to potato flake manufacture in which a significantly greater proportion of the potato cells are ruptured.

The snack food may advantageously also comprise potato flakes and/or other potato dehydrates derived from potatoes of which the starch has a normal amylopectin content. That allows adjustment of the amylopectin content of the snack food, and thus extra control of the product texture. It is also possible, in principle, to prepare potato flakes and/or granules having a range of amylopectin contents by blending two or more types of potatoes having different amylopectin contents, for example an amylopectin (waxy) potato and a normal potato, before dehydration. Whilst it is within the scope of the invention, such blending is not considered advantageous due to the difficulty of achieving a consistent product when cooking and drying blends of potato types.

Preferably, at least 5%, and more preferably at least 10%, by weight of the snack food is derived from the high amylopectin potato flakes and/or granules. Advantageously, at least 20%, and yet more advantageously 50%, by weight of the snack food is derived from the high amylopectin potato flakes and/or granules.

Preferably, the snack food comprises one or more cereal flours. Added cereal flours, which may modify the texture and flavour of the snack food, may include one or more of, for example, wheat, maize, rice, oat or buckwheat flours.

Preferably the snack food also comprises one or more additives which are typically used in snack food manufacture, for example, flavours, cheese, leaveners, including chemical leaveners, glucose, maltodextrin, sugar, malt, whey, gluten, oil or fat and emulsifiers. Typically, those ingredients will be used in amounts not more than 10% of the dry weight of the snack food although, where appropriate, they may represent a larger proportion of the dry weight. Cheese, in particular, may be present in amounts of up to 20% by dry weight. The amount of oil or fat added may vary widely and may, if desired, be more than 20% dry weight.

Preferably, the snack food is a fried snack food. Fried snack foods are well-known but, in the frying process, there is a tendency for the frying oil to be taken up by the snack food and, while that oil or fat can improve the texture and mouthfeel of the snack food, its presence may be considered undesirable for health or dietary reasons. Preferably, the snack food is a baked snack food. Snack foods having a decreased oil or fat content may be produced by baking instead of, or in addition to a frying step. Such snack foods, however, are generally found to have a hard, unpalatable texture. The snack foods of the present invention, in contrast, have a soft, relatively expanded texture and therefore the invention allows the preparation of potato snack foods which are palatable even when the oil or fat content is relatively low.

The snack food may be an extruded snack food, that is, the snack food may be prepared by extrusion, especially cold extrusion. In cold extrusion, the dough is shaped by forcing it under pressure through a die, with the extruded material being cut into individual pieces and cooked in a subsequent step.

The potato flake and/or granules may be used in combination with an isolated starch. Preferably, the isolated starch is a waxy starch. Advantageously, the waxy starch is a pregelatinised starch, such as pregelatinised waxy potato starch. Advantageously, the snack food according to the invention comprises not more than 25% by weight of pregelatinised waxy potato starch. Preferably, the snack food comprises not more than 10% pregelatinised waxy potato starch.

As already mentioned, the high amylopectin potato flakes and/or granules are prepared from potatoes of which the starch consists of at least 85% amylopectin, and which therefore has an amylopectin proportion that is greater than the 80% typically found in known natural potato varieties. Such potatoes are referred to herein as "high amylopectin potatoes". Potatoes produced by genetically modified potato plants and having a range of amylose contents from 0% to 23% are mentioned in an article by Bruinenberg, P. M. et al in Chemistry & Industry, November 1995, page 881 to page 884. Preferably the high amylopectin flakes and/or granules are derived from potatoes from genetically modified potato plants. It may not, however, be essential that the high amylopectin potato flakes and/or granules be made from potatoes produced by genetically modified potato plants if as envisaged suitable plants are obtained by conventional breeding.

It is especially advantageous for the high amylopectin potato flakes and/or granules to have a starch content which is substantially all amylopectin.

Preferably, the potato flakes and/or granules have been prepared from potatoes from genetically modified potato plants derived from any variety suitable for snack manufacture, such as Saturna. Saturna potatoes (including their modified counterparts) may be stored for up to 9 months at 9° C. without accumulating reducing sugars to such an extent that they are rendered unsuitable for use in the manufacture of potato dehydrates.

Preferably the high amylopectin potato flakes and/or granules are formed from potatoes having not more than 5% by dry weight of reducing sugars. Higher reducing sugar contents are considered unsuitable for use in snack food manufacture because during cooking the reducing sugars may undergo the Maillard reaction to give dark coloured and bitter tasting products. For a snack food which is derived in part from additional ingredients that do not contain significant amounts of reducing sugars it will naturally be possible for the potato flakes and/or granules to have a correspondingly greater reducing sugar content.

The invention also provides potato flakes having a starch content which consists of at least 85% amylopectin. Preferably, the potato flakes have a starch content which consists of at least 90%, preferably at least 95%, and more preferably at least 98% amylopectin.

The invention also provides potato granules having a starch content which consists of at least 85% amylopectin. Preferably the potato granules have a starch content which consists of at least 90%, preferably at least 95%, and more preferably at least 98% amylopectin.

In another aspect, the invention also provides the use of high amylopectin potato flakes and/or high amylopectin potato granules to increase the expansion of a snack food.

The invention also provides a method of preparing a snack food comprising the steps of forming a dough comprising high amylopectin potato flakes and/or high amylopectin potato granules and cooking that dough to give the snack food.

Advantageously, the method also comprises the step of forming the dough into pieces of desired shape prior to cooking.

The step of forming the dough into pieces of desired shape may involve forming the dough into a sheet and cutting shaped pieces from the sheet. The step of forming the dough into pieces of desired shape may be an extrusion step.

It will normally be preferred for the snack food according to the invention to have a moisture content not exceeding 4%, and more preferably not exceeding 3%, by weight based on the total weight of the snack food. The conditions of the cooking step, and in particular the time and temperature, will generally be so selected that the moisture content is reduced to the desired amount.

The manufacture of a number of snack foods will be described in Examples 1 to 7, which illustrate the invention.

EXAMPLE 1

Three doughs of the following composition were prepared:

|  | g | Approximate % Dry Mix |
| --- | --- | --- |
| Low Leach Potato Flakes[a] | 1740 | 98.4 |
| Oil | 15 | 0.9 |
| Blend of mono & diglyceride esters of fatty acids | 5 | 0.3 |
| Salt | 8.5 | 0.5 |
| Water | 1300 | |

[a] Three different compositions of Low Leach Potato Flakes were used for the three doughs, being, respectively 100% normal potato flakes, a 1:1 mixture of normal potato flakes and high amylopectin potato flakes or 100% high amylopectin potato flakes. The high amylopectin potato flakes were prepared entirely from modified Saturna potatoes having a starch content consisting of substantially 100% amylopectin and the normal potato flakes were prepared from conventional Saturna potatoes.

The dry ingredients were mixed together on a Stephan UM12mixer for 30 seconds before adding oil and emulsifier over a period of 15 seconds, adding water gradually over a period of a minute, and mixing further to total time of 3 minutes.

The doughs were then sheeted to a thickness of about 0.8 mm, dockered and cut into round pieces of 20 mm diameter. Some of the shaped pieces were then fried at 165° C. until the moisture content was below 2%. Other shaped pieces were baked at 250° C. until the moisture content was below 2%.

It was found that an increase in the proportion of high amylopectin potato flakes gave more expanded, open products, both when fried and baked.

EXAMPLE 2

Three doughs of the following composition having 0:1, 1:1 and 1:0 combinations of normal potato flakes and high amylopectin potato flakes were prepared according to the method given in Example 1:

|  | g | Approximate % Dry Mix |
| --- | --- | --- |
| Low Leach Potato Flakes | 1740 | 93.4 |
| Oil | 15 | 0.8 |
| Emulsifier | 5 | 0.3 |
| Salt | 8.5 | 0.5 |
| Native potato starch | 93 | 5 |
| Water | 1300 | |

The doughs were shaped as in Example 1 and the shaped pieces were baked at 240° C. until the moisture content was below 2%. The elasticity, shortness and stickiness of the doughs were assessed and allocated a score using a scale from 0 to 5. For elasticity, 0 corresponds to no spring-back and 5 corresponds to immediate spring-back; for shortness 0 corresponds to a tough dough (i.e. a dough that is difficult to pull apart) and 5 corresponds to a crumbly dough; and for stickiness 0 corresponds to a non-sticky dough and 5 corresponds to extremely sticky to the touch. A combination of a shortness of 2 to 4 and an elasticity of 2 to 4 is desirable as such doughs are easier to handle. Each dough was also ranked for overall dough consistency on a scale of 1 to 9. The baked snack foods were subjected to sensory evaluation and measurement and the results are given in Table 1. Sensory evaluation was carried out by a panel of ten selected, trained and experienced people, who were required to indicate their assessment of various sensory characteristics by marking an appropriate point on a line extending from 0 to 100. The samples were tasted in a randomised order to eliminate systematic errors due to taste order, and under anonymous coding to eliminate bias.

TABLE 1

Test results on the baked snack foods of Example 2

| % of high amylopectin potato flakes | Elas[a] | Short[a] | Stick[a] | Rank[b] | HT[c] | Hard[d] | Open[d] | RoB[d] | Smooth[d] | Shiny[d] |
|---|---|---|---|---|---|---|---|---|---|---|
| 0% | 2 | 4 | 3 | 4 | 1.0 | 69 | 51 | 66 | 52 | 14 |
| 50% | 4 | 2.5 | 4 | 6 | 1.6 | 59 | 65 | 74 | 60 | 21 |
| 100% | 4.5 | 0.5 | 4 | 8 | 2.7 | 50 | 76 | 77 | 64 | 44 |

[a]Elasticity, shortness and stickiness of the dough are rated on a 0 to 5 point scale.
[b]Rank is a score between 1 and 9 given to the dough based on a "Dough Rating Scale" outlined in EP 0 324 460 B1.
[c]Height (mm) is an average of 20 measurements taken of baked piece height. The greater the height, the greater the expansion of the product.
[d]Hardness of initial bite (soft = 0; hard = 100), Openness (closed = 0; open = 100). Rate of Breakdown (RoB) (slow = 0; rapid = 100), Smoothness of Paste (particulate = 0; smooth = 100), and Shininess (dull = 0; shiny = 100), are sensory attributes measured by an expert sensory panel. The results given in the table are mean values.

EXAMPLE 3

Six doughs were prepared by the method of Example 1 according to the following composition:

|  | g | % Dry Mix |
|---|---|---|
| Low Leach Potato Flakes[a] | 1470 | 78 |
| Oil | 15 | 0.8 |
| Emulsifier | 5 | 0.3 |
| Salt | 8.5 | 0.5 |
| Starch[b] | 372 | 20 |
| Water | 1300 | |

[a]The Low Leach potato flakes used were either 100% normal potato flakes or a 1:1 combination of normal potato flakes and high amylopectin potato flakes.
[b]Four potato starches were used as follows: native non-waxy; pregelatinised non-waxy; native waxy; and pregelatinised waxy.

The doughs were shaped and baked as in Example 2. The baked snack foods were tested and the results are given in Table 2.

EXAMPLE 4

Snack foods were prepared according to the process of Example 2 but the low leach potato flakes were replaced with standard potato flakes. The results of measurements carried out on the baked snack foods are given in Table 3.

TABLE 3

Results of tests carried out on the snack foods of Example 4

| % of high amylopectin potato flake | Elast[a] | Short[a] | Stick[a] | Rank[b] | Height (mm) |
|---|---|---|---|---|---|
| 0% | 0 | 5 | 0.5 | 1 | 0.5 |
| 50% | 2 | 4 | 2 | 3 | 1 |
| 100% | 3 | 3 | 3.5 | 5 | 2 |

[a]ELasticity, shortness and stickiness of the dough are rated on a 0 to 5 point scale.
[b]Rank is a score between 1 and 9 given to the dough based on a "Dough Rating Scale" outlined in EP 0 324 450 B1.

The high amylopectin potato flake prepared by the standard process was found to give more open baked products

TABLE 2

Test results on the baked snack foods of Example 3

| % of high amylopectin potato flake | Starch | Elas[a] | Sht[a] | Stck[a] | Rank[b] | Ht[c] | Hard[d] | Open[d] | RoB[d] | Sm[d] | Shiny[d] |
|---|---|---|---|---|---|---|---|---|---|---|---|
| 0% | Native Waxy | 2.5 | 4 | 1 | 3 | 1.1 | 71 | 47 | 67 | 52 | 17 |
| 0% | Pregel Waxy | 4.5 | 0.5 | 4 | 8 | 1.1 | 67 | 54 | 68 | 50 | 14 |
| 50% | Native Non-Waxy | 4 | 2 | 1.5 | 6 | 1.2 | 66 | 58 | 71 | 60 | 13 |
| 50% | Native Waxy | 3 | 2 | 3.5 | 5 | 1.2 | 61 | 61 | 71 | 60 | 22 |
| 50% | Pregel Non Waxy | 4.5 | 1.5 | 3 | 6 | 1.5 | 71 | 60 | 68 | 54 | 17 |
| 50% | Pregel Waxy | 4.5 | 0 | 5 | 9 | 1.7 | 65 | 71 | 71 | 54 | 27 |

[a]Elasticity, shortness and stickiness of the dough are rated on a 0 to 5 point scale.
[b]Rank is a score between 1 and 9 given to the dough based on a "Dough Rating Scale" outlined in EP 0 324 460 B1.
[c]Height (mm) is an average of 20 measurements taken of baked piece height. The greater the height, the greater the expansion of the product.
[d]Hardness, Openness, Rate of Breakdown (RoB), Smoothness of Paste, and shininess are sensory attributes measured by an expert sensory panel. The mean results are given in the table.

with improved breakdown and clearance compared to snack foods prepared using normal potato flakes prepared by the standard process.

EXAMPLE 5

Snack foods were prepared using potato flake in combination with wheat flour, to the following composition:

| | g | % Dry Mix |
|---|---|---|
| Low Leach Potato Flake[a] | 863 | 45 |
| Flour | | |
| (Low Protein, Biscuit Type) | 933 | 49 |
| Fat | 95 | 5 |
| Emulsifier[b] | 8.6 | 0.5 |
| Salt | 8.6 | 0.5 |
| Water[c] | 1107,1254 | |

[a]Two different compositions of Low Leach Flakes were used for the two doughs, the first being 100% normal potato flakes and the other 100% high amylopectin flakes. The high amylopectin flakes were as described in Example 1.
[b]The emulsifier used was DATEM (di-acetyltartaric acid esters of mono and diglycerides of fatty acids).
[c]The water level used was the lower level for the normal potato flakes and the higher level for the high amylopectin flakes.

The dry ingredients were mixed together in a Hobart (CC/DD 12 BM EG JN5) mixer for 30 s at speed 1 before adding the water followed by the fat and emulsifier. The whole dough was then mixed to a total of 6 min at speed 2.

The doughs were then shaped and baked as described in Example 2.

It was found that the high amylopectin flake products gave more expansion (piece height 1.3 mm as compared to 0.9 mm) and were softer, more open with improved melt in the mouth.

EXAMPLE 6

Potato flake was used in combination with corn polenta (fine maize flour) to produce baked snack products, to the following composition:

| | g | % Dry Mix |
|---|---|---|
| Low Leach Potato Flake[a] | 863 | 45 |
| Fine Corn Polenta | 933 | 49 |
| Fat | 95 | 5 |
| Emulsifier[b] | 8.6 | 0.5 |
| Salt | 8.6 | 0.5 |
| Water[c] | 1107,1254 | |

[a]Two different compositions of Low Leach Flakes were used for the two doughs, the first being 100% normal potato flakes and the other 100% high amylopectin flakes. The high amylopectin flakes were as described in Example 1.
[b]The emulsifier used was DATEM (di-acetyltartaric acid esters of mono- and di-glycerides of fatty acids).
[c]The water level used was the lower level for the normal potato flakes and the higher level for the high amylopectin flakes.

The doughs were prepared as described in Example 5. The doughs were then shaped and baked as described in Example 2.

The high amylopectin flake products were found to give greater overall expansion (piece height 1.3 mm as compared to 0.8 mm) and the expansion was more even. The products were softer, more open with improved melt in the mouth and faster clearance.

EXAMPLE 7

Snack products were produced through a forming extruder, the doughs used incorporated potato flake in the following formulation:

| | g | % Dry Mix |
|---|---|---|
| Standard Potato Flake[a] | 400 | 22 |
| Normal Potato Granules | 570 | 31 |
| Native Potato Starch | 845 | 46 |
| Salt | 3.75 | 0.2 |
| Water | 1150 | |

[a]Two different compositions of Standard Potato Flakes were used for the two doughs, the first being 100% normal potato flakes and the other 100% high amylopectin flakes (produced from modified Saturna potatoes having substantially all amylopectin).

The dry ingredients were mixed together for 2 min (same mixer described in Example 5) at speed 1. The water was then added whilst mixing over a 30 s period, mixing was continued for a total mix time of 4 min.

600 g of dough was used to charge the extruder barrel of a piston extruder, 1 kg of dough was then added to the barrel and extruded out at a pressure of 60 bar through a die. The extrudate was cut into pieces at a cutter speed of 1750 rpm. The pieces were fried at 190° C. until the moisture content was below 2%.

The dough containing the high amylopectin flakes extruded faster than that containing the normal flakes (1.6 kg min$^{-1}$ compared to 0.6 kg min$^{-1}$), hence giving a greater process throughput. The high amylopectin potato flakes gave more open, more expanded snack products with a softer but crunchier texture. The expansion of the extruded snacks using the high amylopectin flakes increased by 7%.

The invention claimed is:

1. A snack food having a high amylopectin content comprising potato flakes and/or potato granules, wherein 100% of the flakes and/or granules are prepared from potato of which the starch has an amylopectin content of at least 95 wt %,
   wherein at least 50% by weight of the snack food is the flakes and/or granules prepared from potato of which the starch has an amylopectin content of at least 95 wt %,
   wherein dough of the snack food comprises the flakes and/or granules,
   and wherein the snack food comprising flakes and/or granules prepared from potato of which the starch has an amylopectin content of at least 95 wt % becomes more expanded upon cooking than a snack food comprising potato flakes and/or granules prepared from potato of which the starch has a normal amylopectin content of about 80±3 wt %.

2. A snack food according to claim 1, wherein the high amylopectin potato content is substantially all in the form of potato flakes.

3. A snack food according to claim 1, further comprising potato flakes and/or other potato dehydrates prepared from potato of which the starch has a normal amylopectin content of about 80±3 wt %.

4. A snack food according to claim 1, further comprising one or more cereal flours.

5. A snack food according to claim 1, further comprising one or more additives typically used in snack food manufacture.

6. A snack food according to claim 1, wherein the snack food is a fried snack food.

7. A snack food according to claim 1, wherein the snack food is a baked snack food.

8. A snack food according to claim 1, wherein the snack food is an extruded snack food.

9. A snack food according to claim 1, further comprising an isolated starch.

10. A snack food according to claim 9, wherein the isolated starch is a waxy starch.

11. A snack food according to claim 10, wherein the waxy starch is a pregelatinised waxy starch.

12. A snack food according to claim 11, wherein not more than 25% by weight of the snack food is pregelatinised waxy potato starch.

13. A snack food according to claim 12, wherein not more than 10% by weight of the snack food is pregelatinised waxy potato starch.

14. A snack food according to claim 1, wherein the potato flakes and/or granules, prepared from potato of which the starch has a amylopectin content of at least 95 wt %, are from a genetically modified potato plant.

15. A snack food according to claim 14, wherein the modified potato plant is derived from a Saturna variety.

16. A snack food according to claim 1, wherein the potato flakes and/or granules, comprising starch with a high amylopectin content, are from potatoes having not more than 5% by dry weight of reducing sugars.

17. A snack food according to claim 1, further comprising an oil and/or an emulsifier.

* * * * *

UNITED STATES PATENT AND TRADEMARK OFFICE
CERTIFICATE OF CORRECTION

PATENT NO.       : 7,553,508 B1                                      Page 1 of 1
APPLICATION NO.  : 09/936242
DATED            : June 30, 2009
INVENTOR(S)      : Wainwright et al.

It is certified that error appears in the above-identified patent and that said Letters Patent is hereby corrected as shown below:

Table 3, column 8, line 41:

Now reads: "outlined in EP 0324 4<u>5</u>0 B1"

Should read: -- outlined in EP 0324 4<u>6</u>0 B1 --

Signed and Sealed this

Fifteenth Day of September, 2009

David J. Kappos
*Director of the United States Patent and Trademark Office*